Patented Mar. 28, 1950

2,501,798

UNITED STATES PATENT OFFICE 2,501,798

BLOCKING-LAYER CELL

Willem Christiaan van Geel and Adrianus Jacobus Dekker, Eindhoven, Netherlands, assignors, by mesne assignments, to Hartford National Bank and Trust Company, Hartford, Conn., as trustee No Drawing. Application April 9, 1946, Serial No. 660,862. In the Netherlands September 2, 1944

Section 1, Public Law 690, August 8, 1946
Patent expires September 2, 1964

9 Claims. (Cl. 175—366)

This invention relates to a method of manufacturing blocking-layer cells comprising a blocking layer which, at least for part of its thickness, is not genetic, more particularly selenium cells having a blocking layer which consists entirely or partly of selenium, and to blocking layer cells thus manufactured. The expression blocking layer cells with an entirely or partly non-genetic blocking layer is to be understood to mean cells consisting of a conductive and a semi-conductive electrode separated by a thin insulating layer which at least for part of its thickness is not formed from any of the electrodes.

It is known to manufacture selenium rectifiers in which the blocking layer, for instance consisting of quartz, magnesium oxide or other oxides or amorphous selenium, is applied onto the semi-conductive electrode by vaporisation. The method of applying it by vaporisation has the drawback of insufficient reproducibility, due to which the electric properties of the cells may greatly vary.

According to the invention, in blocking-layer cells comprising a blocking layer which, at least for part of its thickness, is not genetic, the non-genetic part of the blocking layer is applied electrochemically. This method of application has the advantage of having the dosing of the applied substance well under control, in addition, the layer applied has a very homogeneous character, as a result of which the invention permits the manufacture of selenium cells having excellent properties in a completely reproducible manner.

According to a special embodiment of the invention the blocking layer is obtained by means of electrophoresis. From a colloidal suspension of selenium in water or in another dispersion may thus be formed, for instance, very thin, homogeneous compact layers of selenium having, for instance, a thickness of say $0.1\mu$.

A thin blocking layer of excellent quality can also be made by electrolytic reduction of a solution, for instance a solution of a selenium compound, such as selenious acid in water or of selenium dioxide in an alcohol.

In manufacturing selenium cells the blocking layer is preferably applied on to the semi-conductive electrode consisting of selenium, followed by applying the conducting electrode usually consisting of a metal having a low melting point. If desired, the semi-conductive electrode may already be provided with a surface-layer having a lower conductibility than the remainder of the semi-conductive electrode as described in U. S. Patent No. 2,139,731 issued December 13, 1938, to J. H. De Boer and W. C. van Geel. The blocking layer may also be applied on to the metal electrode. With a rectifying cell consisting of a metal plate, for instance a nickel plate, against which is pressed a semi-conductive electrode, for instance of copper iodide, with the interposition of a blocking layer, the blocking layer may, according to the invention, be precipitated onto the metal. For example, a blocking layer may be formed on the nickel by electrolysis of a 10% aqueous solution of copper formiate, for instance with a current density of 10 ma./cm.$^2$, in which case insulating cuprous oxide is obtained, or by electrolytic reduction of a 5% aqueous solution of pink salt, which presumably yields insulating compounds of bivalent tin.

Example 1

An aluminium plate covered with an adherent carbon layer is provided with a semi-conductive selenium layer by applying on to it molten selenium having added to it a small quantity of zirconium chloride for raising the conductibility; after that the selenium is treated with quinoline and finally, as the case may be after the selenium layer has been pressed flat, the assembly is heated for some time in order to convert the selenium into the crystalline modification. The semi-conductive layer obtained is introduced as a cathode into a solution of 25 gms. of selenium dioxide in 250 cm.$^3$ glycol, followed by passing through it for 10 minutes a current having a density of 0.3 ma./cm.$^2$, so that the plate is covered with a layer of amorphous selenium. After the electrolysis the plate is rinsed with water and alcohol and then heated for about 2 minutes at 190° C. to transform the amorphous selenium into the crystalline modification. If the plate is covered over 1 cm.$^2$ with a metal layer consisting of an alloy of cadmium, bismuth and tin having a low melting point, and a voltage of 2 v. is applied, the current in the direction of transmission of the cell, the so-called forward current, appears to be 240 ma. A current of 10 ma. in the opposite direction, the so-called blocking direction, can only be obtained at a counter-voltage of 18.

If the rectifying cell thus obtained is first formed by passing a current through it for some time in the blocking direction, the forward current amounts to 285 ma. at 2 volts and the counter voltage to 36 volts for 10 ma.

Example 2

Onto a plate covered with a semi-conductive selenium layer, obtained in the manner set out in the first example, is applied a selenium blocking layer from an aqueous colloidal selenium solution by electrophoresis for 15 minutes with a current density of 0.3 ma./cm.² The colloidal selenium solution is obtained by adding to a solution of 3.5 cm.³ of hydrazine hydrate in 100 ccm. of water, heated at 60° C., a solution of 0.5 g. of selenium dioxide in 5 ccm. water. This solution has a negative charge, so that the semi-conductive selenium plate should be connected as an anode during the electrophoresis. By proceeding after precipitation of the selenium layer, similarly to the first example, one obtains a forward current of 55 ma. at 2 volts and a countervoltage of 8 with 10 ma. After formation these amounts are 70 ma. and 16 volts.

What we claim is:

1. A method of manufacturing a blocking layer cell, which comprises the steps of electrophoretically depositing a homogeneous selenium blocking layer on an electrode of said cell, and applying a counter-electrode on said blocking layer.

2. A method of manufacturing a blocking layer cell, which comprises the steps of applying a layer of selenium to a base to form an electrode thereon, treating said selenium layer with quinoline, converting the selenium into the conducting crystalline modification, cathodically depositing a layer of selenium from a solution of selenium dioxide in glycol to form a homogeneous layer of amorphous selenium on said electrode, converting said amorphous selenium to the crystalline modification thereof and thereby forming a selenium blocking layer on said selenium electrode, and applying a counter-electrode on said second layer of selenium.

3. A selenium blocking layer cell comprising a semi-conductive selenium electrode, an electro-deposited homogeneous selenium blocking layer on said electrode, and a counter-electrode on said blocking layer.

4. A selenium blocking layer cell comprising a semi-conductive selenium electrode, an electrophoretically deposited homogeneous selenium blocking layer on said electrode, and a counter-electrode on said blocking layer.

5. A selenium blocking layer cell comprising a semi-conductive selenium electrode, an electrolytically deposited homogeneous selenium blocking layer on said electrode, and a counter-electrode on said blocking layer.

6. In the manufacture of a blocking layer cell having a semi-conductive selenium electrode applied to a metallic base member and a non-genetic blocking layer on the selenium electrode, the steps comprising electrolytic depositing a homogeneous layer of amorphous selenium on said selenium electrode, converting the amorphous selenium to the crystalline modification thereof to form the non-genetic blocking layer on the selenium electrode, and applying a metallic counter-electrode over the blocking layer to form the blocking layer cell.

7. In the manufacture of a blocking layer cell having a semi-conductive selenium electrode applied on a metallic base member and a non-genetic blocking layer on the selenium electrode, the steps comprising electrophoretically depositing a homogeneous layer of amorphous selenium on said selenium electrode, converting the amorphous selenium to the crystalline modification thereof to form the non-genetic blocking layer on the selenium electrode, and applying a metallic counter-electrode over the selenium blocking layer to form the blocking layer cell.

8. A method of manufacturing a blocking layer cell which comprises the steps of applying a semi-conductive layer of selenium on a metallic base member to form an electrode of the cell thereon, electrochemically depositing a homogeneous selenium blocking layer on said electrode, and applying a counter-electrode on the said blocking layer.

9. A method of manufacturing a blocking layer cell which comprises the steps of applying a semi-conductive layer of selenium on a metallic base member to form an electrode of the cell thereon, electrolytically depositing a homogeneous selenium blocking layer on the said electrode, and applying a counter-electrode on the said blocking layer.

WILLEM CHRISTIAAN VAN GEEL.
ADRIANUS JACOBUS DEKKER.

REFERENCES CITED

The following references are of record in the file of this patent:

UNITED STATES PATENTS

| Number | Name | Date |
|---|---|---|
| 1,743,160 | Presser | Jan. 14, 1930 |
| 2,197,497 | Geisler | Apr. 16, 1940 |
| 2,221,596 | Lorenz | Nov. 12, 1940 |
| 2,223,203 | Brunke | Nov. 26, 1940 |
| 2,391,706 | Jackson et al. | Dec. 25, 1945 |
| 2,414,438 | Bloom | Jan. 21, 1947 |

FOREIGN PATENTS

| Number | Country | Date |
|---|---|---|
| 522,092 | Great Britain | June 7, 1940 |

OTHER REFERENCES

Chemical Abstracts, vol. 34, 1940, page 2713.